(12) United States Patent
Daumas et al.

(10) Patent No.: US 11,518,129 B2
(45) Date of Patent: Dec. 6, 2022

(54) TRANSFER AND POSING OF A SEMI-FINISHED PRODUCT DESTINED FOR USE IN TIRE PRODUCTION

(71) Applicant: COMPAGNIE GENERALE DES ETABLISSEMENTS MICHELIN, Clermont-Ferrand (FR)

(72) Inventors: Franck Daumas, Clermont-Ferrand (FR); Matthieu Lutz, Clermont-Ferrand (FR); Christophe Bessac, Clermont-Ferrand (FR); Alexandre Laval, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 422 days.

(21) Appl. No.: 16/755,933

(22) PCT Filed: Oct. 1, 2018

(86) PCT No.: PCT/EP2018/076630
§ 371 (c)(1),
(2) Date: Apr. 14, 2020

(87) PCT Pub. No.: WO2019/076617
PCT Pub. Date: Apr. 25, 2019

(65) Prior Publication Data
US 2020/0316891 A1 Oct. 8, 2020

(30) Foreign Application Priority Data
Oct. 16, 2017 (FR) ...................................... 1759678

(51) Int. Cl.
*B29D 30/30* (2006.01)
*B29D 30/28* (2006.01)
*B29D 30/44* (2006.01)

(52) U.S. Cl.
CPC ......... *B29D 30/3042* (2013.01); *B29D 30/28* (2013.01); *B29D 30/3007* (2013.01);
(Continued)

(58) Field of Classification Search
CPC ............ B29D 30/30; B29D 2030/3064; B29D 2030/3078; B29D 2030/4493;
(Continued)

(56) References Cited

U.S. PATENT DOCUMENTS

| 3,012,602 A | 12/1961 | Nebout |
| 3,455,764 A | 7/1969 | Bryant |

(Continued)

FOREIGN PATENT DOCUMENTS

EP 1867467 A1 12/2007

OTHER PUBLICATIONS

International Search Report dated Dec. 4, 2018, in corresponding PCT/EP2018/076630 (2 pages).

*Primary Examiner* — Geoffrey L Knable
(74) *Attorney, Agent, or Firm* — Venable LLP

(57) ABSTRACT

The invention is directed to a posing assembly (30) that effects transfer and posing of a semifinished product (100) that is destined for inclusion in a tire. The invention is also directed to a tire production system (10) for transferring and posing a semi-finished product (100) that is destined for inclusion in a tire, which system includes the disclosed posing assembly. A method is provided for transferring and posing a semi-finished product (100) upon a rotating forming drum (40) having a circumferential forming surface (40*a*) during a product posing cycle, which method includes a step of providing a tire production system as disclosed.

17 Claims, 9 Drawing Sheets

(52) U.S. Cl.
CPC ............... *B29D 2030/3078* (2013.01); *B29D 2030/4493* (2013.01); *B65H 2301/44714* (2013.01)

(58) Field of Classification Search
CPC .... B65G 47/90; B65G 47/902; B65G 47/904; B65G 47/91; B65G 47/915; B65H 20/12; B65H 35/08; B65H 2301/44336; B65H 2301/44714
See application file for complete search history.

(56) References Cited

U.S. PATENT DOCUMENTS

| | | | | |
|---|---|---|---|---|
| 4,090,913 | A | * | 5/1978 | Zodrow .................... B65C 3/14 156/571 |
| 4,222,810 | A | | 9/1980 | Ytterstrom |
| 4,276,104 | A | | 6/1981 | Riggs |
| 4,891,082 | A | * | 1/1990 | Broyles .............. B29D 30/3007 156/405.1 |
| 7,235,147 | B2 | * | 6/2007 | Suda ...................... B29D 30/44 156/134 |
| 2007/0289694 | A1 | | 12/2007 | Macheffe et al. |

\* cited by examiner

TRANSFER AND POSING OF A SEMI-FINISHED PRODUCT DESTINED FOR USE IN TIRE PRODUCTION

TECHNICAL FIELD

The invention relates generally to tire production and more particularly to the uninterrupted transfer and posing of semi-finished products that are destined for inclusion in tires.

BACKGROUND

Tires are commonly constructed from multiple layers and components that are placed sequentially onto an expandable and contractable building drum. Among these components may be one or more semi-finished products that are employed in combination with green tires to derive desired tire properties (for example, in the production of pneumatic tires that sustain performance on snow and performance on ice). As used herein, a "semi-finished product" refers to an unvulcanized elastomeric material and also refers to an assembly of an unvulcanized elastomeric material and a cover layer. The semi-finished product (or "product") has a substantially constant thickness and is supplied as an elongate element having a length superior to its width and thickness. It is understood that the term "elongate element" is interchangeable with terms such as "rubber sheet", "elongated rubber sheet", "rubber element", "elongated rubber element" and "rubber member" to refer to sheets or layers of unvulcanized elastomeric material destined for use in tires and tire products (e.g., for inner liners, sidewalls, carcasses, treads, etc.). An elastomeric material that is used in the semi-finished product may be selected from styrene-butadiene copolymer (SBR), natural rubber (NR), butadiene rubber (BR) and equivalents thereof.

Systems for laying and posing elongate elements are known wherein the elongate element is cut during its transfer by a supply conveyor to a building drum (see, for example, European patent EP1867467B). A longitudinal transporter grips an edge of a cut portion (for example, using one or more suction cups) and transports the cut portion toward the building drum for posing thereon. Such systems thus require sufficient cycle time to anticipate the length of the cut element, to accurately position the building drum, and to recover and pose the product upon the building drum prior to installation of the product thereon.

Opportunities exist, therefore, for optimizing production cycle time while preserving product integrity during a process of tire fabrication. The disclosed invention provides a solution that realizes a process for following, applying and cutting the semi-finished product as close as possible to the forming drum, thereby eliminating time spent in product recovery. This is accomplished while also attaining uniformity of the cut product and eliminating the risk of product deformation between cutting and posing of the product.

SUMMARY

The present invention is directed to a posing assembly that effects transfer and posing of a semi-finished product that is destined for inclusion in a tire. The posing assembly includes a cylindrical carrier of predetermined length and having a central longitudinal axis and a carrier surface having a predetermined circumferential extent. The posing assembly also includes a lune that is movable relative to the carrier with the lune having an arcuate outer lune surface with an apex defined therealong and an opposed arcuate inner lune surface positioned proximate the carrier surface, and with the outer lune surface and the inner lune surface being bound by a leading edge and a trailing edge. The posing assembly further includes an actuatable yoke coupled with the carrier such that actuation of the yoke effects corresponding actuation of the posing assembly, the yoke having a fixed extent pivotably secured to a support surface and an opposed free extent with the yoke being actuatable between a ready position, at which the apex of the outer lune surface positions a leading edge of the semi-finished product in linear spaced alignment with a posing point of the forming surface, and a posing position, at which the apex engages the posing point and thereby effects posing of the leading edge of the semi-finished product upon a rotating forming drum having a circumferential forming surface upon which the semi-finished product is posed during the product posing cycle.

In certain embodiments, the posing assembly also includes a blade carrier having a cutting edge facing externally of a coupling extent coupled with the free extent of the yoke, with the blade carrier being rotatable about a predefined axis of rotation.

In certain embodiments, the posing assembly also includes a transfer mechanism having a central axis coincident with the central longitudinal axis of the carrier and in rotatable communication with the lune such that rotation of the transfer mechanism effects corresponding passage of the lune along the circumferential extent of the carrier surface; a cutting mechanism having a central axis coincident with the axis of rotation of the blade carrier and in rotatable communication with the blade carrier such that rotation of the cutting mechanism effects corresponding rotation of the blade carrier relative to a tangential cutting point at which the blade carrier contacts the outer lune surface and the cutting edge effects cutting of the semi-finished product, with rotation of the transfer mechanism effecting corresponding rotation of the cutting mechanism and the blade carrier; and a reciprocating satellite element that urges the semi-finished product into alternative engagement with the carrier surface and the outer lune surface during the product posing cycle. In certain such embodiments, the satellite element includes an elongate pivoting arm of predetermined length with a coupling extent pivotably connected with a support and an opposed pressing extent having a pressing member rotatably disposed thereat and urged into alternative engagement with the carrier surface and the outer lune surface as the lune passes along the circumferential extent of the carrier surface.

In certain embodiments, the posing assembly includes an actuator disposed in communication with the yoke intermediate the central longitudinal axis of the carrier and the fixed extent of the yoke.

In certain embodiments, the posing assembly is operably disposed intermediate the forming drum and a conveyance assembly that transports the semi-finished product toward the posing assembly.

In certain embodiments, the lune includes a suction outlet positioned at the apex of the outer lune surface through which suction air is supplied for retention of the leading end of the semi-finished product.

In certain embodiments, an arcuate extent of the arcuate inner surface of the lune engages up to about 140° of the circumferential extent of the carrier surface.

The present invention is also directed to a tire production system for transferring and posing a semi-finished product that is destined for inclusion in a tire. The tire production system includes the disclosed posing assembly; a conveyance assembly that transports the semi-finished product at a constant predetermined speed toward the posing assembly; and a rotating forming drum having a circumferential forming surface upon which the semi-finished product is posed during a product posing cycle.

In certain embodiments of the tire production system, the conveyance assembly includes at least one continuous conveyor belt having an entry extent for receipt of the semi-finished product from an upstream tire production installation and an exit extent that facilitates departure of the semi-finished product from the conveyor belt; and a delivery roller disposed adjacent the exit extent of the conveyor belt that receives a leading end of the semi-finished product.

In certain embodiments, the tire production system also includes a storage spool that furnishes the semi-finished product at the upstream tire production installation.

The present invention is also directed to a method for transferring and posing a semi-finished product upon a rotating forming drum having a circumferential forming surface during a product posing cycle. The method includes the steps of providing a tire production system as disclosed; transporting the semi-finished product from an upstream tire production installation toward the posing assembly; transferring a leading edge of the semi-finished product to the posing assembly when the posing assembly is in the ready position; posing the leading edge of the semi-finished product along at least a portion of the forming surface when the posing assembly is in the posing position; and actuating the posing assembly between the ready position and the posing position.

In certain embodiments, the method also includes the steps of actuating the lune relative to the carrier surface so as to draw the leading edge of the semi-finished product toward the apex of the outer lune surface; continuously urging the semi-finished product into alternating engagement with the outer lune surface and the carrier surface as the lune traverses the circumferential extent of the carrier surface; and calculating a quantity of the semi-finished product that is needed to complete a product posing cycle.

In certain embodiments, the method also includes the steps of determining a quantity of the semi-finished product that has been posed along at least a portion of the forming surface during a product posing cycle; and cutting the semi-finished product when the quantity of the semi-finished product that has been posed equals a quantity of the semi-finished product that is needed to complete a product posing cycle.

In certain embodiments, the method also includes, after the step of cutting the semi-finished product, the step of continuously urging the semi-finished product into alternative engagement with the outer lune surface and the carrier surface.

In certain embodiments, the method also includes the step of forming a joint between the leading end and a trailing end of the semi-finished product formed during the step of cutting the semi-finished product.

In certain embodiments, the method also includes the step of identifying a tangential cutting point at which the blade carrier contacts the outer lune surface and cuts the semi-finished product during the step of cutting the semi-finished product.

Other aspects of the presently disclosed invention will become readily apparent from the following detailed description.

BRIEF DESCRIPTION OF THE DRAWINGS

The nature and various advantages of the presently disclosed invention will become more apparent upon consideration of the following detailed description, taken in conjunction with the accompanying drawings, in which like reference characters refer to like parts throughout, and in which.

DETAILED DESCRIPTION

Figure 1:
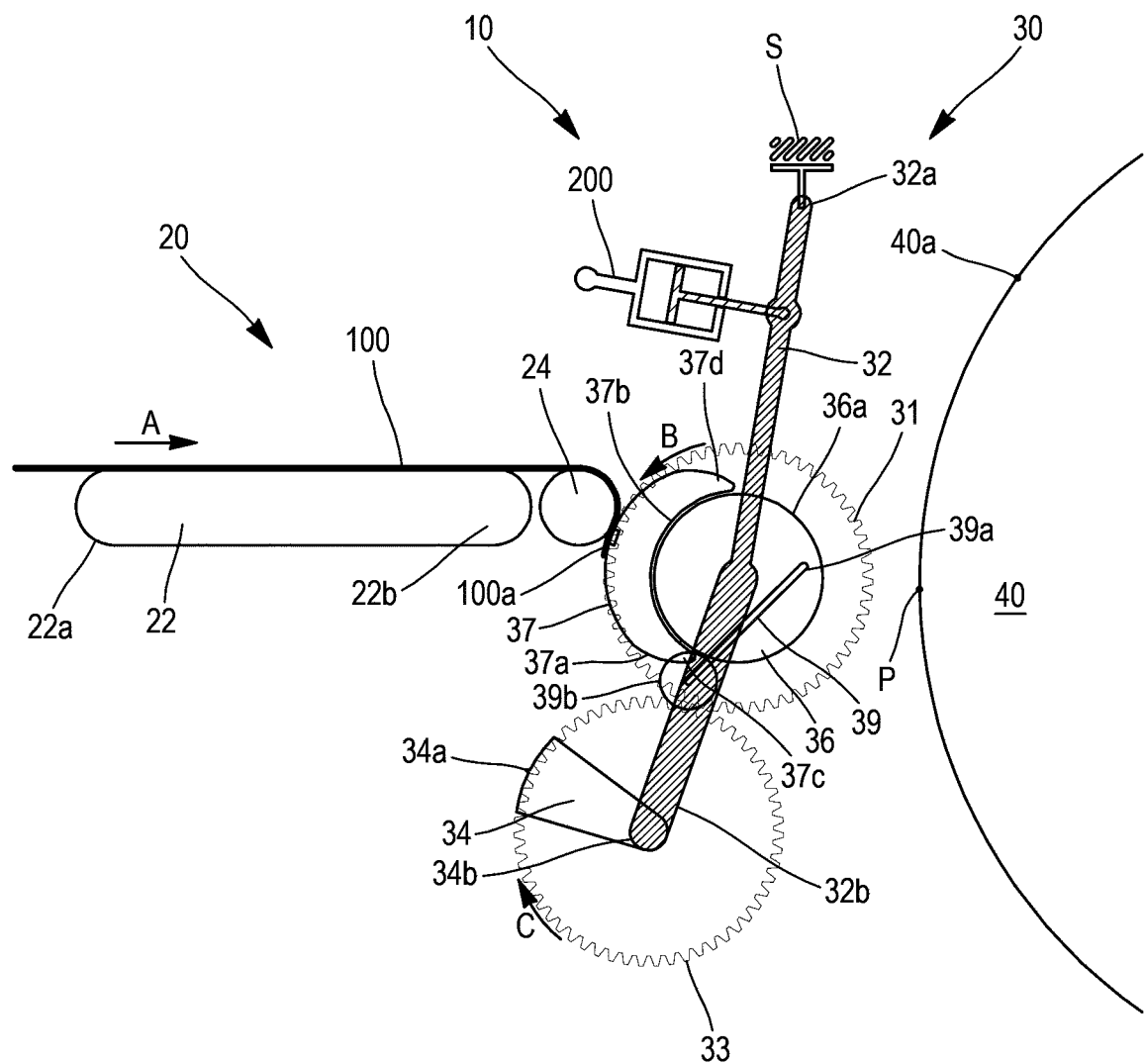
FIG. 1 shows a schematic representation of a tire production system of the invention during a step of delivering a semi-finished product to a posing assembly of the tire production system.

Now referring further to the figures, in which like numbers identify like elements, a tire production system 10 may be provided that includes a conveyance assembly 20, a posing assembly 30 and a rotatable forming drum 40. The posing assembly 30 effects transfer and posing of a semi-finished product 100 that is destined for inclusion in a tire or semi-finished tire component. One or more complementary and/or supplementary tire production installations may be positioned upstream and/or downstream of the posing assembly 30, each of which realizes at least one tire production process thereat.

A semi-finished product that is intended for processing by the posing assembly 30 includes at least one unvulcanized elastomeric layer and optionally includes a cover layer assembled therewith. The elastomeric layer is fabricated from a material selected among natural rubber, various synthetic elastomers (e.g., SBR, BR, etc.) and various elastomer blends. For embodiments of the semi-finished product 100 having a cover layer, the cover layer may comprise a collection of fibers that may be selected from textile fibers of natural origin (for example, silk fibers, cotton fibers, bamboo fibers, cellulose, wood fibers and combinations and equivalents thereof). In a preferred embodiment, the cover layer is a paper layer of the type VN1016 type vinyl having a metric weight at or about 16 g/m$^2$. It is not intended to detach the cover layer from the elastomeric layer during a sequence of supplying the semi-finished product. The semi-finished product has a maximum thickness from about 4 mm to about 6 mm, inclusive, and preferably has a thickness from about 0.2 mm to about 2 mm, inclusive. For embodiments of the semi-finished product 100 having a cover layer, the cover layer has a thickness of about 0.1 mm.

Referring to FIG. 1, the conveyance assembly 20 includes at least one continuous conveyor belt 22 that transports the semi-finished product 100 along a predefined linear path toward the posing assembly 30 (see arrow A of FIGS. 1 to 8). The conveyor belt 22 includes an entry extent 22a that receives the semi-finished product 100 from an upstream tire production installation (e.g., a storage spool or other storage installation). The conveyor belt 22 transports the semi-finished product 100 at a constant predetermined speed toward an exit extent 22b that facilitates departure of the semi-finished product from the conveyor belt. A delivery roller 24 that is disposed adjacent the exit extent 22b receives a leading end 100a of the semi-finished product 100 for eventual transfer to the posing assembly 30. The conveyor belt 22 can include one or more continuous conveyor belts or equivalent transport means. The posing assembly 30 is operably disposed intermediate the conveyance assembly 20 and the forming drum 40 upon which the semi-finished product 100 is posed during tire production. The circumferentially rotating forming drum 40 is typically a cylindrical shape having a flat profile along the axial direction and a circumferential extent along a forming surface 40a, although it may include recesses for accepting features such as circular beads. As used herein, the terms "forming drum", "drum," "assembly drum" and "tambour" may be used interchangeably to refer to a circumferentially rotating element having a surface for receipt of one or more tire components during tire production.

Still referring to FIG. 1, the posing assembly 30 includes a yoke 32 having a fixed extent 32a pivotably secured to a support surface S (e.g., a ceiling, a scaffold, etc.) and an opposed free extent 32b having a blade carrier 34 rotatably coupled thereat. The blade carrier 34 has a cutting edge 34a facing externally of a coupling extent 34b at which the blade carrier 34 and the yoke 32 are coupled. In this configuration, actuation of the yoke 32 effects corresponding actuation of the posing assembly 30.

The yoke 32 is provided as an integral member of predetermined length intermediate the fixed extent 32a and the free extent 32b. The yoke may be alternatively provided as an articulatable member having one or more elongate elements that are pivotably coupled with one another. Actuation of the yoke 32 may be effected by an actuator 200 that imparts linear movement to the yoke 32. In some embodiments, the actuator 200 may be operably coupled with the yoke 32 intermediate the fixed extent 32b and the free extent 32b. It is understood that actuation may be effected by a piston-cylinder unit as shown and also by equivalent actuators (e.g., pneumatic actuators, hydraulic actuators, electronic actuators, etc.).

The posing assembly 30 also includes a cylindrical carrier 36 having a predetermined length amenable for transfer of the semi-finished product 100 to the forming drum 40. The carrier 36 has a central longitudinal axis along which the carrier is coupled with the yoke 32. In this embodiment, the actuator 200 is disposed in communication with the yoke 32 intermediate the carrier's central longitudinal axis and the fixed extent 32b of the yoke. When the actuator 200 is in operation, it actuates the posing assembly 30 between a ready position, in which the leading end 100a of the semi-finished product 100 is in linear spaced alignment with a posing point P of the forming surface 40a (see FIGS. 3 and 8), and a posing position, in which leading end 100a is posed along the forming surface 40a at the posing point P (see FIG. 4).

The carrier 36 also includes a carrier surface 36a having a predetermined circumferential extent along which a generally annular member (or "lune") 37 passes during operation of the posing assembly 30. The lune 37 is defined by an arcuate outer lune surface 37a and an opposed arcuate inner lune surface 37b positioned proximate the carrier surface 36a. The outer lune surface 37a and the inner lune surface 37b are bounded by a leading edge 37c and a trailing edge 37d. In some embodiments, an arcuate extent of the arcuate inner surface 37b of the lune 37 engages up to about 1400 of the circumferential extent of the carrier surface 36a.

The lune is driven by a transfer mechanism 31 having a central axis coincident with the central longitudinal axis of the carrier 36. The transfer mechanism 31 is provided as a gear mechanism in rotatable communication with the lune 37 such that rotation of the transfer mechanism effects corresponding passage of the lune 5 along the carrier surface 36a of the stationary carrier 36 (see, for example, arrow B of FIGS. 1 to 10).

Figure 2:
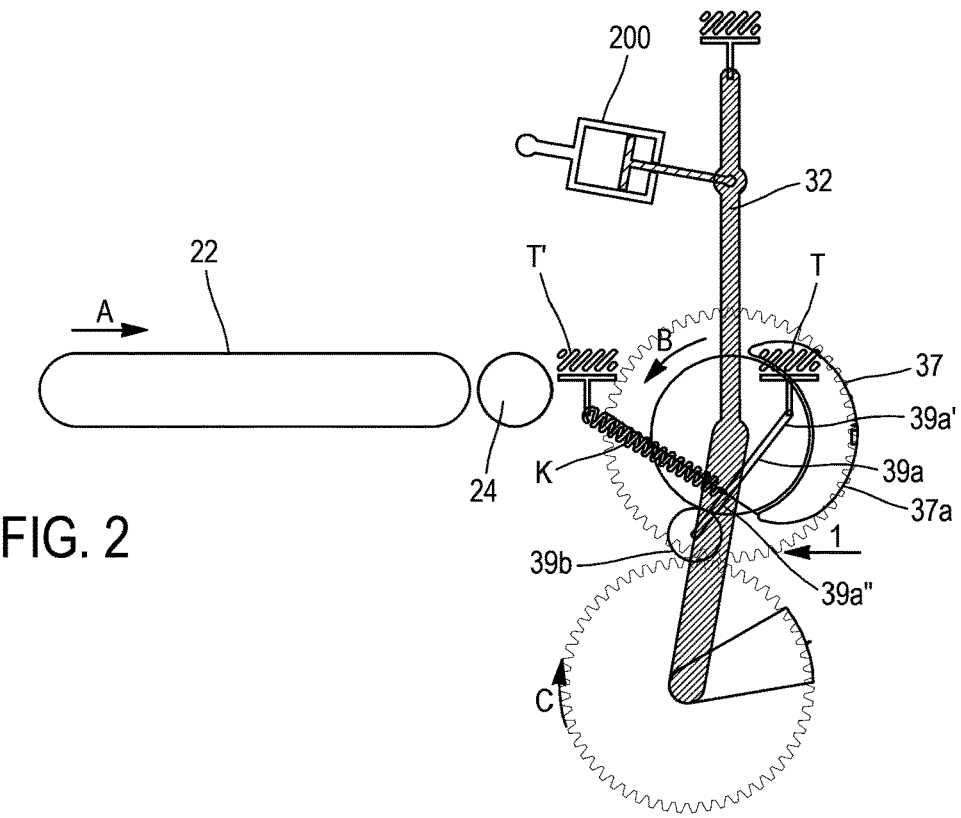
FIG. 2 shows the posing assembly of FIG. 1 having a satellite element in continuous engagement with a carrier surface of the posing assembly.
Figure 3:
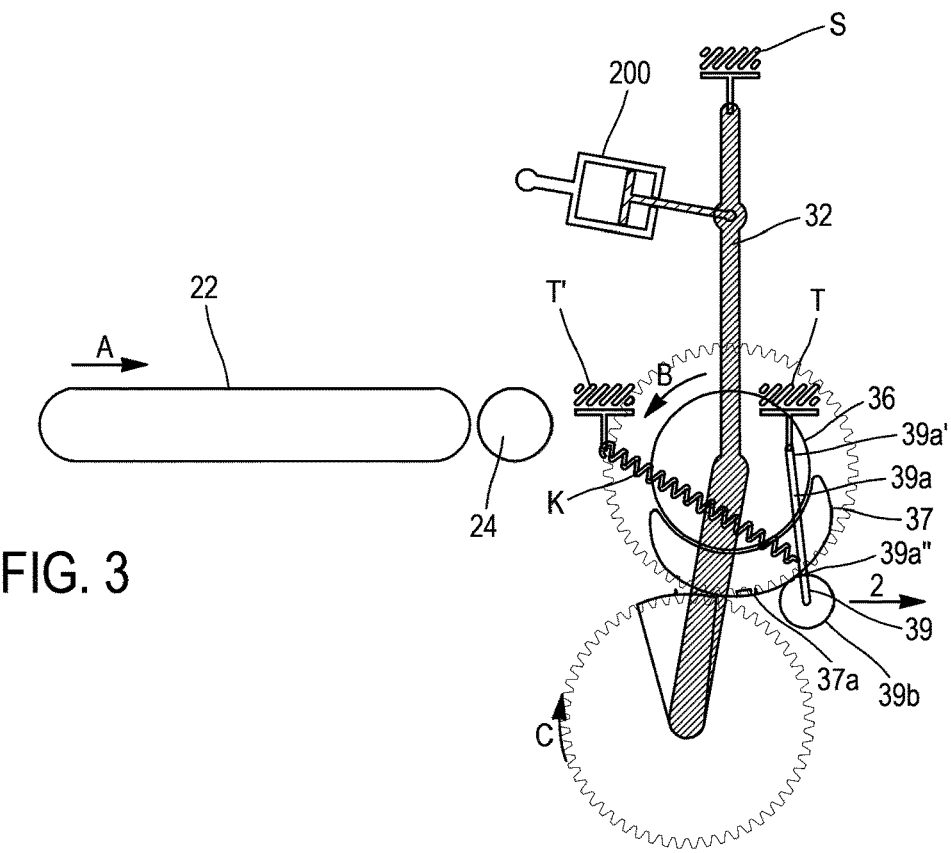
FIG. 3 shows the posing assembly having the satellite element in continuous engagement with an outer lune surface of the posing assembly.
Figure 4:
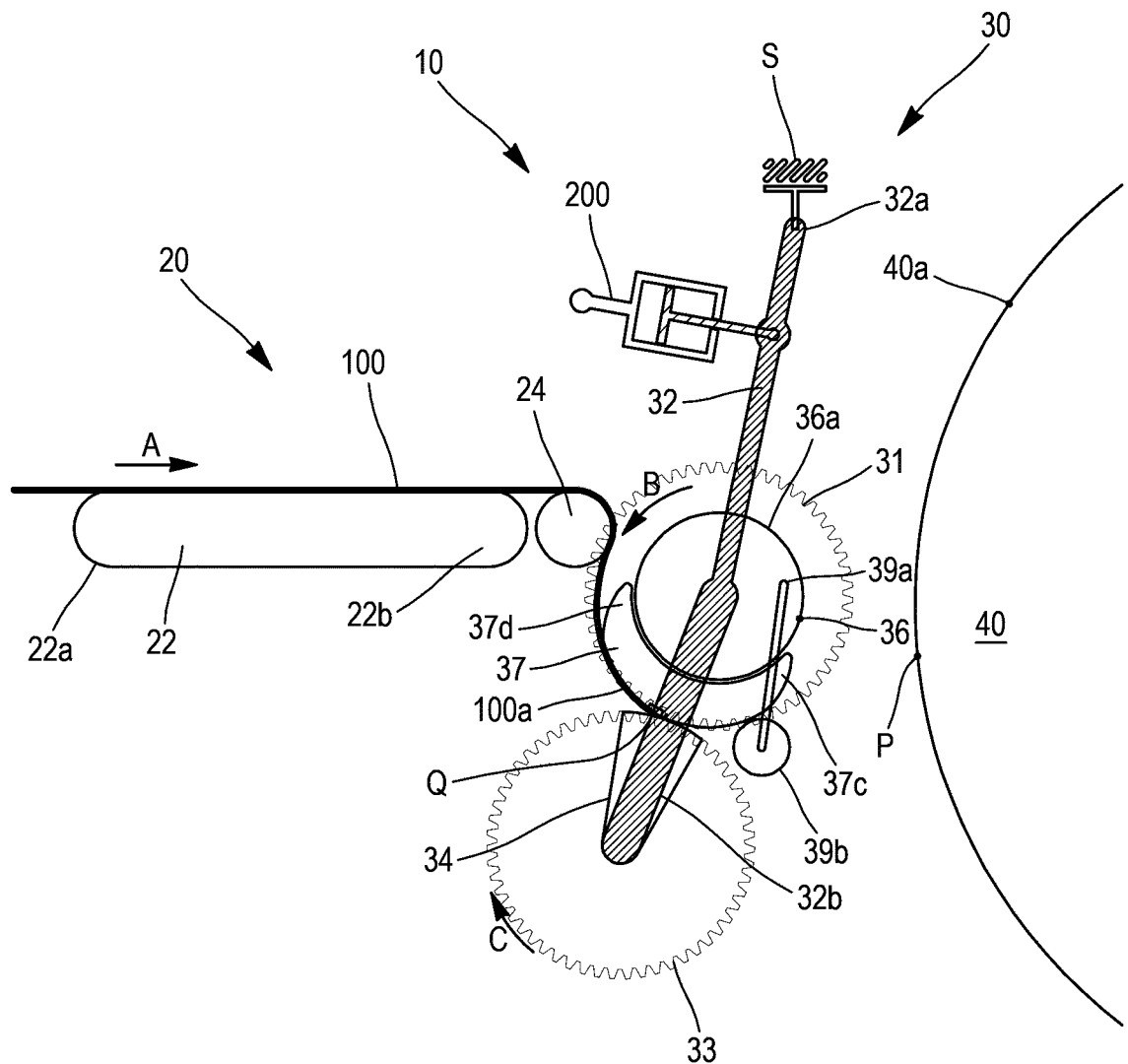
FIG. 4 shows a schematic representation of the tire production system of the invention during the step of delivering a semi-finished product to the posing assembly.

Still referring to FIG. 1 and additionally referring to FIGS. 2 and 3, the carrier 36 includes a reciprocating satellite element 39 that continuously urges the semi-finished product 100 in alternating contact with the carrier surface 36a and the outer lune surface 37a as the lune 37 passes along the circumferential extent of the carrier surface 36a during a product posing cycle. The satellite element 39 includes an elongate pivoting arm 39a of predetermined length having a coupling extent 39a' that is pivotably secured to a support T. The pivoting arm 39a also includes an opposed pressing extent 39a" having a pressing member 39b rotatably disposed thereat. As seen in FIG. 2, a spring K acting on the pivoting arm 39a (and secured to a support T') urges the satellite 39 toward the carrier surface 36a (see the arrow 1 of FIG. 2), thereby effecting continuous engagement of the pressing member 39b with the carrier surface (as described herein with respect to FIGS. 5 to 7 and FIG. 10). As further seen in FIG. 3, as the lune 37 traverses the carrier surface 36a and guides the satellite into engagement with the outer lune surface 37a (see the arrow 2 of FIG. 3), the spring K acting on the pivoting arm 39a urges the satellite 39 toward the outer lune surface (as described herein with respect to FIGS. 4 and 8).

The pressing member 39b is desirably an elongate application roller that substantially covers an entire width of the semi-finished product 100 as the semi-finished product is transferred along each of the carrier surface 36a and the outer lune surface 37a during a product posing cycle. Alternatively, the pressing member may include a series of rotatable discs that are aligned and arranged consecutively so as to cover the entire width of the semi-finished product 100. In such embodiments, the pressing member 39b applies pressure evenly across each of the carrier surface 36a and the outer lune surface 37a, thereby maintaining the semi-finished product 100 in an accurate posing position throughout the product posing cycle.

Figure 5:
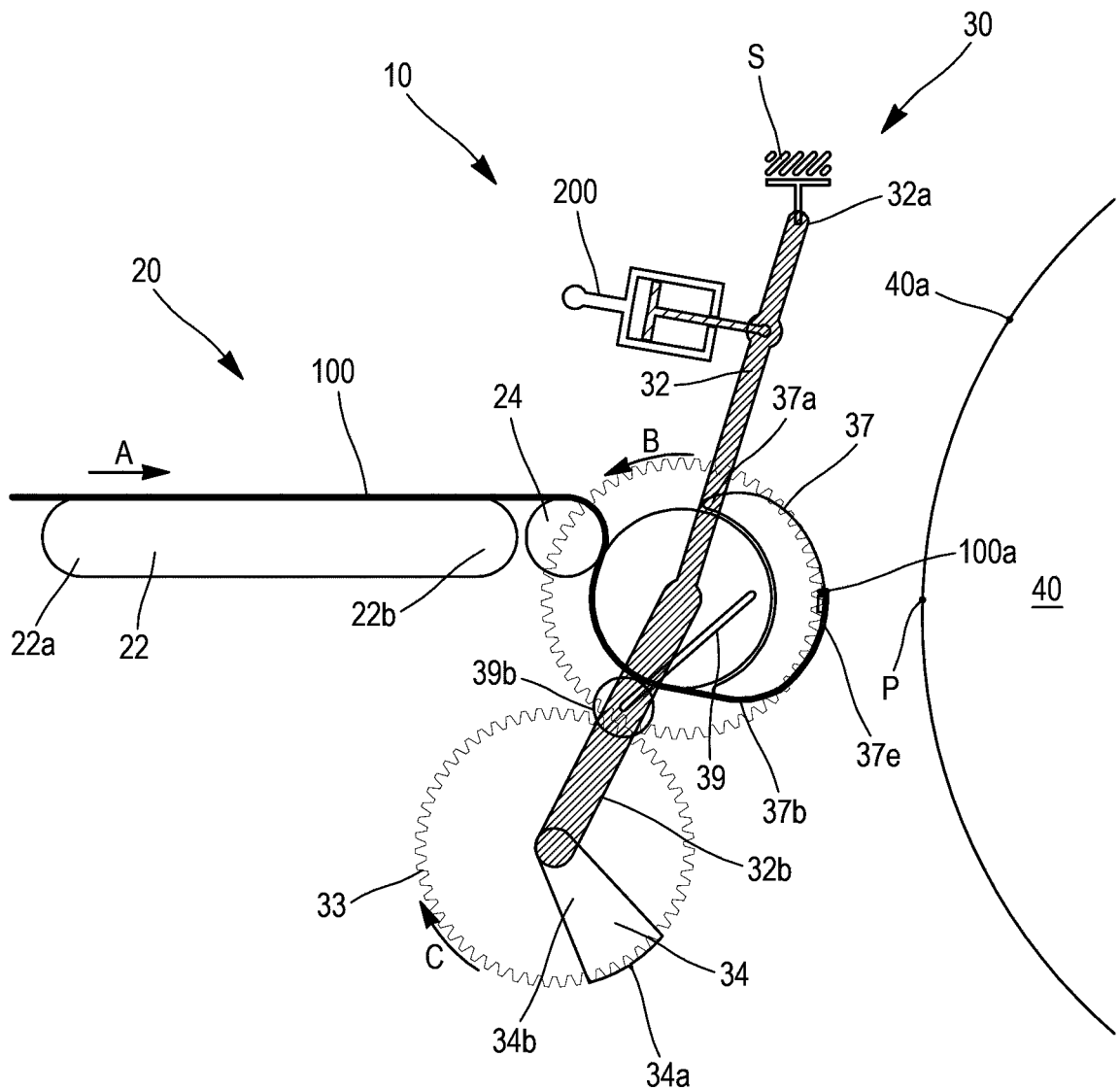
FIG. 5 shows the tire production system of the invention with the posing assembly in a ready position.

The lune 37 includes a suction outlet 37e positioned at an apex of the outer lune surface 37a (see FIG. 5). A conduit (not shown) delivers suction to the suction outlet 37e in a known manner such that the leading edge 100a of the semi-finished product is drawn toward the apex and retained thereat for the duration of the product posing cycle. As described herein, the semi-finished product 100 is cut and a new leading end (referred to herein as a "successive leading end") is produced thereby. The suction outlet 37e thus draws and retains not only the leading end 100a but also draws and retains each newly formed successive leading end such that the semi-finished product 100 is always readily applied upon the forming surface 40a.

The posing assembly 30 further includes a cutting mechanism 33 having a central longitudinal axis along which the blade carrier 34 is rotatably affixed. The cutting mechanism 33 drives the blade carrier 34 so as to effect rotation of the blade carrier in a predetermined direction (see, for example, arrow C of FIGS. 1 to 10). The blade carrier 34 includes a cutting edge 34a having one or more blades that cut the semi-finished product 100 to a predetermined length during a product posing cycle (further described herein). The cutting mechanism 33 is provided as a complementary gear mechanism to the transfer mechanism 31 such that rotation of the transfer mechanism effects corresponding rotation of the cutting mechanism and the blade carrier.

The operation of the tire production system 10, including the operation of the posing assembly 30 is now described with reference to FIG. 1 and FIGS. 4 to 10.

Referring to FIG. 1, the semi-finished product 100 is transported from an upstream tire production installation to the conveyance assembly 20. The semi-finished product 100 is disposed upon the conveyor belt 22 such that the delivery roller 24 transfers a leading end 100*a* of the semi-finished product to the posing assembly 30. When the upstream tire production installation includes a storage spool that furnishes the semi-finished product, the storage spool may be in communication with at least one braking device that maintains a consistent speed of rotation during unwinding of the semi-finished product. The speed of the storage spool may be varied as a function of the supply of the semi-finished product 100 to the forming drum 40 and the pull exerted on the semi-finished product by the posing assembly 30.

Referring to FIG. 1, while awaiting transfer of the semi-finished product 100 from the conveyance assembly 20, the posing assembly 30 is in a position wherein the apex of the outer lune surface 37*a* is directly adjacent a circumferential extent of the delivery roller 24. The satellite element 39 is at rest, that is, the pressing member 39*b* is urged toward the leading edge 37*c* of the lune 37 without engaging either the carrier surface 36*a* or the outer lune surface 37*a*. As the delivery roller 24 feeds the semi-finished product 100 to the posing assembly 30, the apex of the outer lune surface 37*a* is already positioned to receive the leading end 100*a* of the semi-finished product. The suction outlet 37*e* applies suction to the leading end 100*a*, thereby drawing the leading end to the outer lune surface 37*a*. In this configuration, only the lune 37 remains in contact with the leading end 100*a* (and with each successive leading end) during the product posing cycle. Still referring to FIG. 1 and referring also to FIG. 4, the transfer mechanism 31 rotates in the direction of arrow B so as to drive the lune 37 in a counter-clockwise direction relative to the carrier surface 36*a*. As the lune 37 travels along its circumferential path, the leading edge 37*c* of the lune 37 urges the satellite element 39 (and particularly the pressing member 39*b* thereof) into engagement with the outer lune surface 37*a*. The pressing member 39*b* follows the arcuate contour of the outer lune surface 37*a* as the lune traverses the circumferential extent of the carrier surface 36*a*.

The rotation of the transfer mechanism 31 also drives the rotation of the cutting mechanism 33 so that the blade carrier 34 approaches the apex of the outer lune surface 37*a*. During this rotation, the suction outlet 37*e* continuously delivers suction to the leading end 100*a* of the semi-finished product 100. The semi-finished product 100 is thus drawn toward a tangential cutting point Q at which the blade carrier 34, and particularly the cutting edge 34*a* thereof, contacts the outer lune surface 34*a* with sufficient pressure to ensure a clean cut by the blade or blades through the semi-finished product 100. Upon initiation of the transfer of the semi-finished product 100 as shown in FIG. 2, the cutting edge 34*a* precedes the leading edge 100*a* so that no cut is realized upon the semi-finished product 100.

Referring additionally to FIG. 5, the transfer mechanism 31 continues rotating so as to direct the apex of the outer lune surface 37*a* in direct linear opposition relative to the tangential posing point P on the forming surface 40*a*. The continued rotation of the transfer mechanism 31 also drives the rotation of the cutting mechanism 33 so as to effect clockwise advancement of the blade carrier 34 (and thus the cutting edge 34*a*) away from the cutting point Q. During this rotation, the lune 37 draws the semi-finished product 100 along a portion of the lune intermediate the apex and the trailing edge 37*d*. The pressing member 39*b* engages the semi-finished product therealong. The continued rotation draws the semi-finished product 100 into engagement with the carrier surface 36*a*, and the pressing member 39*b* is correspondingly urged against the carrier surface after clearing the trailing edge 37*d* of the lune. The leading end 100 of the semi-finished product 100 is now in position for posing upon the forming surface 40*a* (i.e., the posing assembly 30 is in the ready position).

Figure 6:
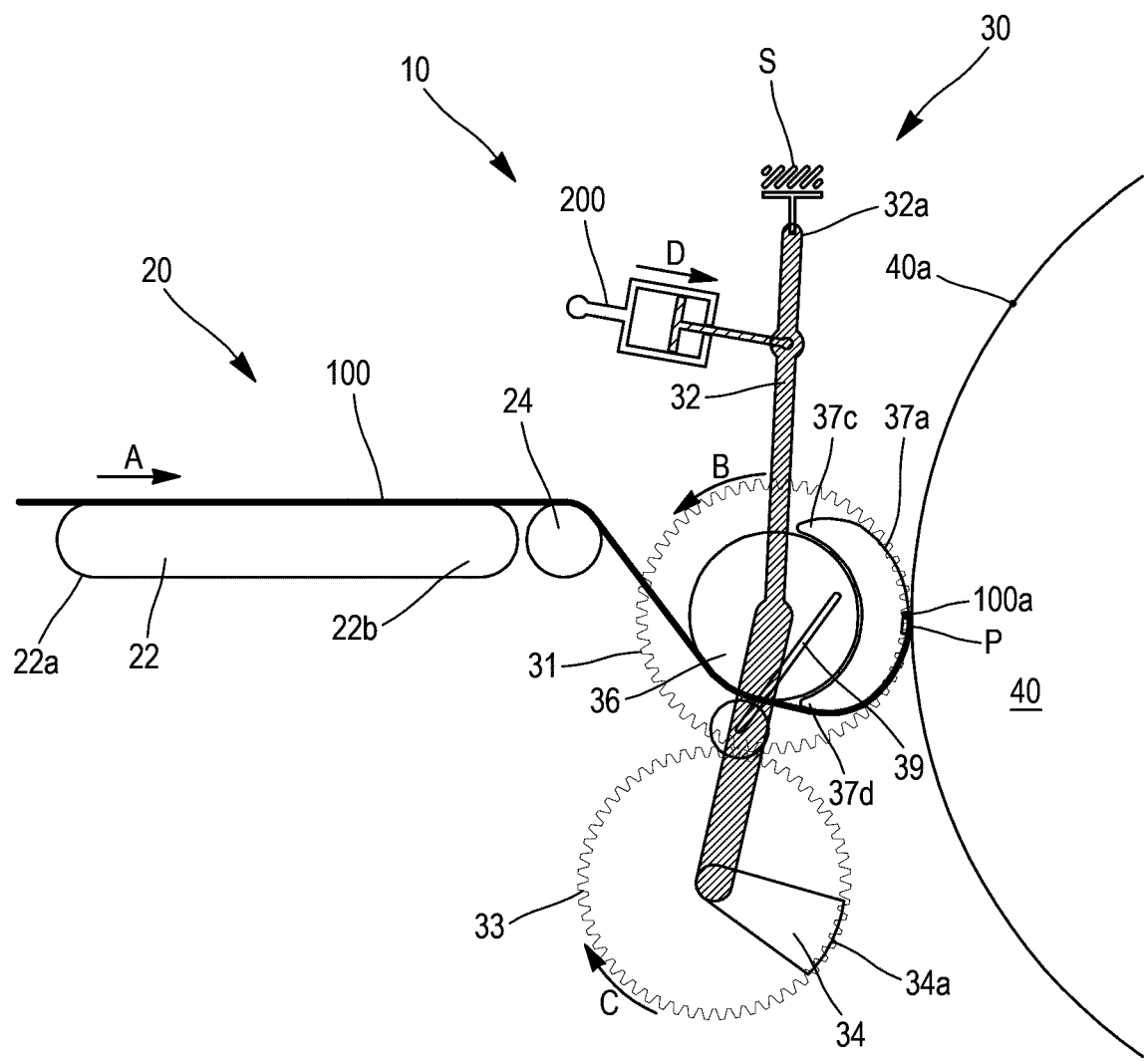
FIGS. 6 and 7 show the tire production system of the invention during posing of the semi-finished product.
Figure 7:
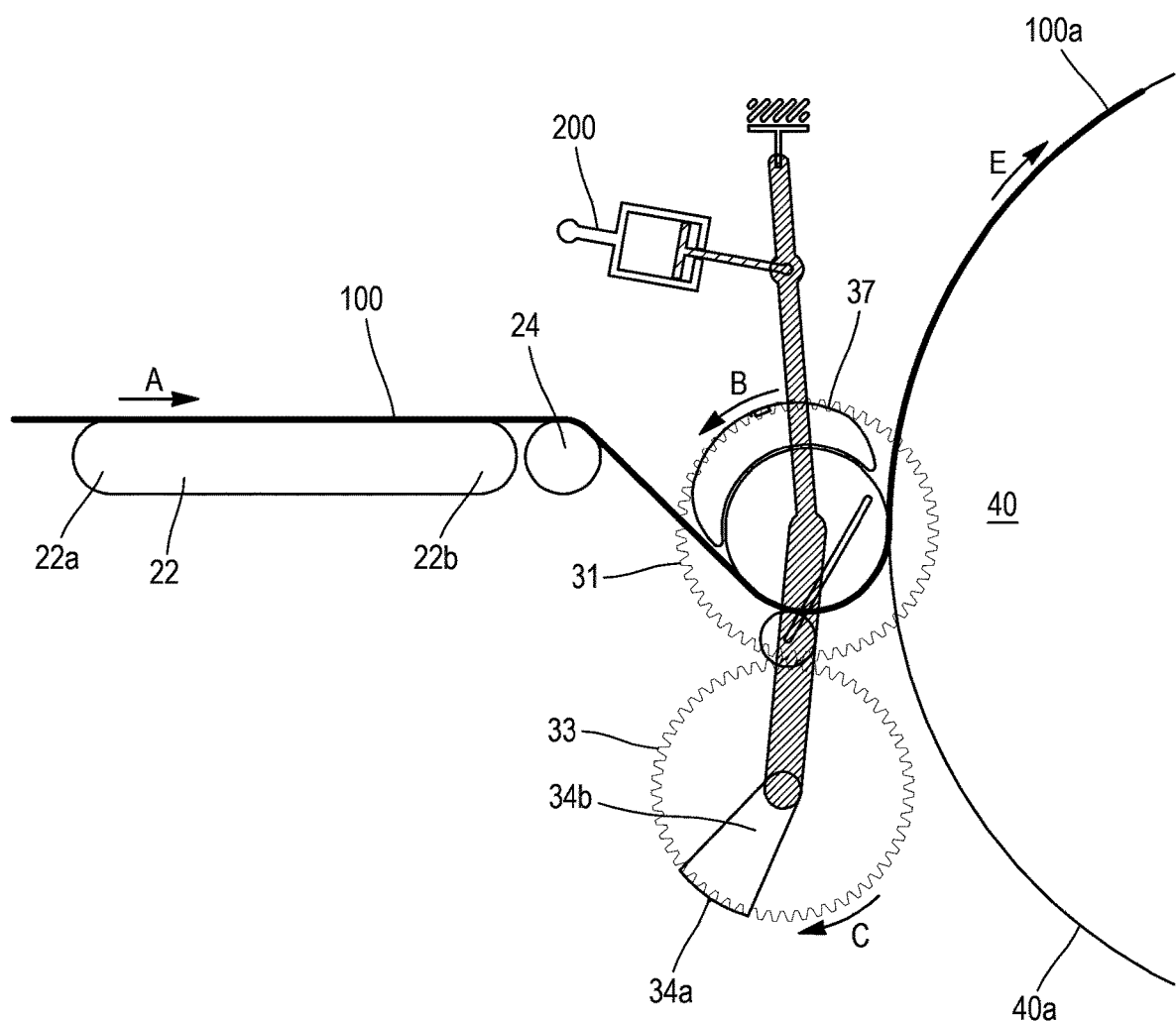

Referring to FIGS. 6 and 7, the actuator 200 commences actuation of the yoke 32 so as to advance the posing assembly 30 toward the forming drum 40 (see arrow D of FIG. 6). Such advancement brings the posing assembly 30 from the ready position to the posing position, at which the apex, and therefore the leading end 100*a* of the semi-finished product 100, engages the posing point P on the forming surface 40*a*. Once the leading end 100*a* of the semi-finished product 100 is posed upon the forming surface 40*a*, the forming drum 40 rotates so as to effect at least a partial placement of the semi-finished product therearound (see arrow E of FIG. 7).

During rotation of the forming drum 40, the transfer mechanism 31 continues rotation and thereby advances the lune 37 along the circumferential extent of the carrier surface 36*a*. The continued rotation of the transfer mechanism 31 effects corresponding rotation of the cutting mechanism 33 so as to effect clockwise advancement of the blade carrier 34 toward the cutting point Q. As the lune 37 progresses along the carrier surface 36*a*, the pressing member 39*b* of the satellite element 39 continuously engages the semi-finished product 100 that passes along the carrier surface 36*a*. As the trailing edge 37*d* of the lune 37 clears a portion of the semi-finished product 100 being posed upon the forming surface 40*a*, the leading edge 37*c* the lune 37 approaches a portion of the semi-finished product 100 being transferred to the posing assembly 30 by the delivery roller 24. The carrier surface 36*a* therefore engages the semi-finished product 100 at the posing point P of the forming surface 40*a* and maintains even pressure against the semi-finished product as the forming drum 40 rotates.

Figure 8:
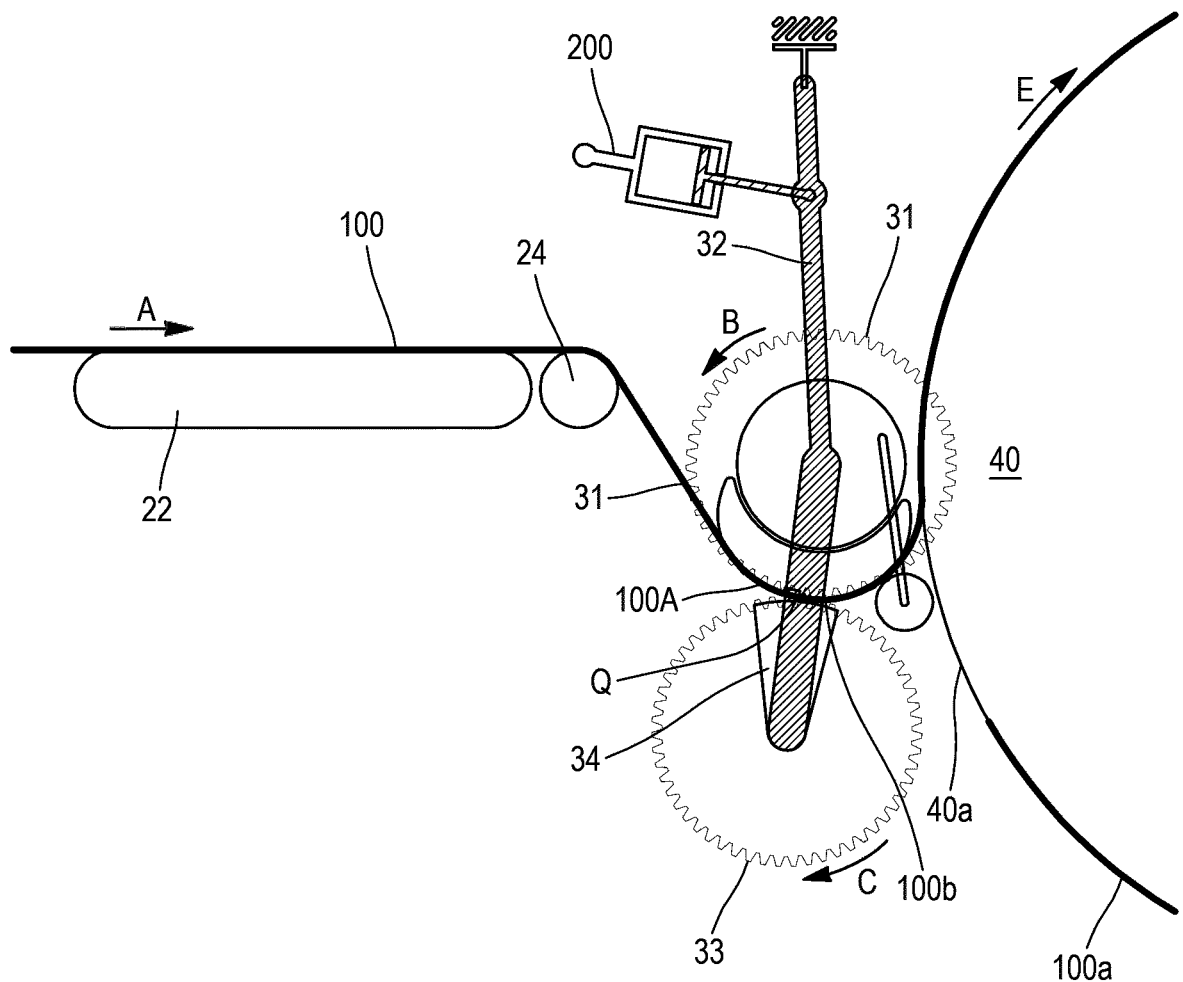
FIG. 8 shows the tire production system of the invention during cutting of the semi-finished product.

Referring to FIG. 8, the semi-finished product 100 is arranged along at least a portion of the circumferential extent of the rotating forming surface 40*a* as the transfer mechanism 31 continues its rotation. The continued rotation of the transfer mechanism 31 advances the lune 37 along the circumferential path around the carrier surface 36*a* and also drives the rotation of the cutting mechanism 33 (see arrow C of FIG. 8). Both the lune 37 and the blade carrier 34 have now completed at least one full revolution relative to the cutting point Q (see FIG. 4). During transit of the lune 37, the leading edge 37*c* of the lune again urges the pressing member 39*b* of the satellite element 39 into engagement with the outer lune surface 37*a* and corresponding engagement with the semi-finished product 100 transferred thereby. The pressing member 39*b* follows the arcuate contour of the outer lune surface 37*a* and maintains the semi-finished product therealong as the lune traverses the circumferential extent of the carrier surface 36*a*.

Before cutting the semi-finished product 100, a calculation is effected in order to determine whether a sufficient quantity of the semi-finished product 100 has been posed along at least a portion of forming surface 40a to complete a product posing cycle. For example, an encoder may be provided that is in signal communication with one or more processors (such as one or more programmable logic controllers or PLCs). The encoder may be an optical encoder that converts rotary displacement into digital or pulse signals. Since the forming drum 40 has a constant diameter, and the circumferential measurement of the forming surface 40a remains constant, a distance (DIS) travelled by a rotating object having a circumference (C) (and thus a corresponding quantity of semi-finished product) can therefore be determined by the number of rotations (N) made by the object (as determined by the formula DIS=((Encoder ticks 360)*C). An additional calculation is effected in order to determine a remaining quantity of the semi-finished product that is needed to complete a product posing cycle. As shown herein, a product posing cycle is determined by the amount of the semi-finished product that is required to be posed upon the forming surface 40a during one complete revolution of the forming drum 40. It is understood, however, that a product posing cycle may include application of the semi-finished product during one or more revolutions of the forming drum 40. Upon determination that a sufficient quantity of the semi-finished product 100 has been posed upon the forming surface 40a, the apex is positioned directly opposite the cutting point Q as the cutting edge 34a passes along the semi-finished product 100.

Figure 9:
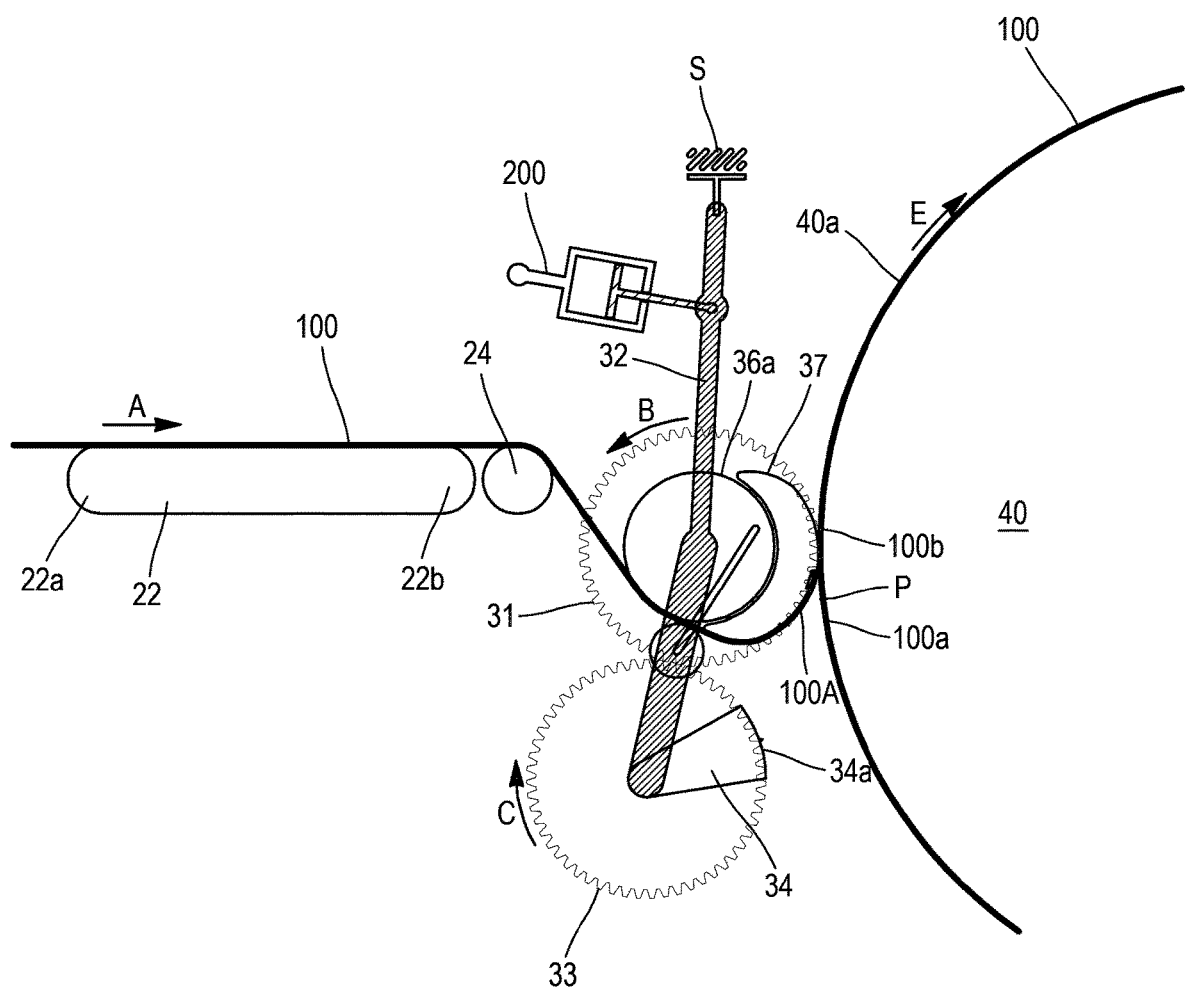
FIG. 9 shows the tire production system of the invention during posing of a trailing end of the semi-finished product.

Still referring to FIG. 8 and also referring to FIG. 9, the cutting edge 34a cuts the semi-finished product 100 so as to create a trailing end 100b of the product that will form a joint with the leading end 100a that is already positioned on the forming surface 40a. A successive leading end 100A is also created in the newly cut semi-finished product 100 that will be posed upon the forming surface 40a during a subsequent product posing cycle. With the posing assembly 30 still in the posing position, the transfer mechanism 31 continues rotation so as to transmit the lune 37 around the carrier surface 36a, thereby transporting the trailing end 100b of the cut semi-finished product along the outer lune surface 37a. The cutting mechanism 33 continues simultaneous rotation so as to bring the blade carrier 34, and thus the cutting edge 34a, away from the cutting point Q. The pressing member 39b of the satellite element 39 is continuously urged against the outer lunar surface 37a toward the trailing edge 37d of the lune 37. The pressing member thus continuously engages the semi-finished product 100 without interruption from the trailing end 100b of the semi-finished product to the successive leading end 100A. At the same time, the lune 37 poses the trailing end 100b of the semi-finished product on the forming surface 100b. The outer lune surface 37a maintains engagement with the trailing end 100b of the semi-finished product to ensure the formation of a suitable joint between the leading end 100a and the trailing end 100b of the semi-finished product.

During this transfer of the cut semi-finished product 100 to the forming surface 40a, the suction outlet 37e delivers continuous suction to the successive leading edge 100A of the cut semi-finished product, thereby drawing the semi-finished product toward the apex. The pressing member 39b simultaneously retains engagement with the semi-finished product 100 along the outer lune surface 30 37a.

Figure 10:
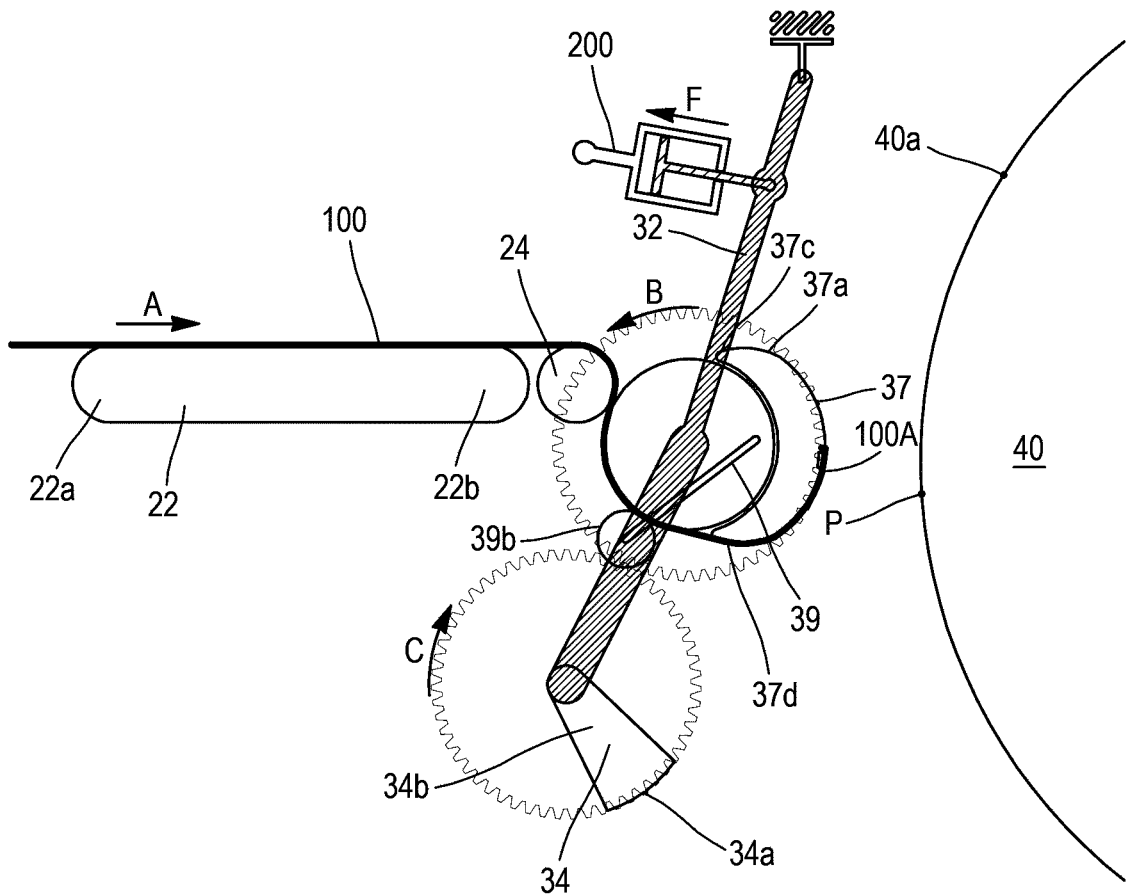
FIG. 10 shows the tire production system of the invention with the posing assembly resuming the ready position.

Referring to FIG. 10, the actuator 200 completes the product posing cycle upon actuation of the yoke 32 so as to retract the posing assembly 30 toward the conveyance assembly 20 (see arrow F of FIG. 10). Such retraction brings the posing assembly 30 from the posing position to the ready position, at which the apex, and therefore the successive leading edge 100A of the semi-finished product 100, is positioned for immediate engagement of the posing point P upon commencement of the subsequent product posing cycle. The rotation of the forming drum 40 may be continuous or it may be intermittent (for example, the rotation may be interrupted to permit transfer of the posed product therefrom, or to permit installation of an identical or equivalent forming drum). The posing assembly 30, having already effected transfer of the semi-finished product 100 from the conveyance assembly 20, retains the semi-finished product in position for immediate commencement of the subsequent product posing cycle. The process as shown from FIGS. 6 to 10 can be repeated until the supply of the semi-finished product is exhausted.

The posing assembly 30 may be included in a work station that is one of several work stations in a tire production facility. Thus, tire production may take place through an automated and continuous process in which posing and bonding of the semi-finished products are effected within a minimal cycle time. One or more tire profiles may be preprogrammed (for example, as by one or more programmable logic controllers, or PLCs) such that a single production session can accommodate identical semi-finished products multiple times and/or varying semi-finished products in succession (e.g., semi-finished products of varying thicknesses). One or more controllers or control systems (collectively "controllers") may determine the instructions to drive the various components of the posing assembly 30 as well as the conveyance assembly 20 and the forming drum 40 (e.g., measured values and correction algorithms). Such controllers may also synchronize the posing assembly 30 as determined by circumferential movement of the forming drum (e.g., to bring the posing assembly 30 between the ready position and the posing position). These controllers may communicate with one or more sensors and one or more timers as is known in the art.

The terms "at least one" and "one or more" are used interchangeably. Ranges that are described as being "between a and b" are inclusive of the values for "a" and "b."

While particular embodiments of the disclosed devices have been illustrated and described, it will be understood that various changes, additions and 16 modifications can be made without departing from the spirit and scope of the present disclosure. Accordingly, no limitation should be imposed on the scope of the presently disclosed invention, except as set forth in the accompanying claims.

What is claimed is:

1. A posing assembly that effects transfer and posing of a semi-finished product that is destined for inclusion in a tire, the posing assembly comprising:

a cylindrical carrier of predetermined length and having a central longitudinal axis and a carrier surface having a predetermined circumferential extent;

a lune that is movable relative to the carrier, with the lune having an arcuate outer lune surface with an apex defined therealong and an opposed arcuate inner lune surface positioned proximate the carrier surface, and with the outer lune surface and the inner lune surface being bound by a leading edge and a trailing edge of the lune; and an actuatable yoke coupled with the carrier such that actuation of the yoke effects corresponding actuation of the posing assembly, the yoke having a fixed extent pivotably secured to a support surface and an opposed free extent, with the yoke being actuatable between a ready position, at which the apex of the outer lune surface positions a leading edge of the semi-finished product in linear spaced alignment with a posing point of a rotating forming drum having a circumferential forming surface upon which the semi-finished product is posed during a product posing cycle, and a posing position, at which the apex engages the posing point and thereby effects posing of the leading edge of the semi-finished product upon the forming surface.

2. The posing assembly of claim 1, further comprising a blade carrier having a cutting edge facing externally of a coupling extent coupled with the free extent of the yoke, with the blade carrier being rotatable about a predefined axis of rotation.

3. The posing assembly of claim 2, further comprising:
a transfer mechanism having a central axis coincident with the central longitudinal axis of the carrier and in rotatable communication with the lune such that rotation of the transfer mechanism effects corresponding passage of the lune along the circumferential extent of the carrier surface;
a cutting mechanism having a central axis coincident with the axis of rotation of the blade carrier and in rotatable communication with the blade carrier such that rotation of the cutting mechanism effects corresponding rotation of the blade carrier relative to a tangential cutting point at which the blade carrier contacts the outer lune surface and the cutting edge effects cutting of the semi-finished product, with rotation of the transfer mechanism effecting corresponding rotation of the cutting mechanism and the blade carrier; and
a reciprocating satellite element that urges the semi-finished product into alternative engagement with the carrier surface and the outer lune surface during the product posing cycle.

4. The posing assembly of claim 3, wherein the satellite element includes an elongate pivoting arm of predetermined length with a coupling extent pivotably connected with a support and an opposed pressing extent having a pressing member rotatably disposed thereat and urged into alternative engagement with the carrier surface and the outer lune surface as the lune passes along the circumferential extent of the carrier surface.

5. The posing assembly of claim 1, further comprising an actuator disposed in communication with the yoke intermediate the central longitudinal axis of the carrier and the fixed extent of the yoke.

6. The posing assembly of claim 1, wherein the posing assembly is operably disposed intermediate the forming drum and a conveyance assembly that transports the semi-finished product toward the posing assembly.

7. The posing assembly of claim 1, wherein the lune includes a suction outlet positioned at the apex of the outer lune surface through which suction air is supplied for retention of the leading edge of the semi-finished product.

8. The posing assembly of claim 1, wherein an arcuate extent of the arcuate inner surface of the lune engages up to about 140° of the circumferential extent of the carrier surface.

9. A tire production system for transferring and posing a semi-finished product that is destined for inclusion in a tire, the tire production system comprising:
a posing assembly according to claim 1;
a conveyance assembly that transports the semi-finished product at a constant predetermined speed toward the posing assembly; and
a rotating forming drum having a circumferential forming surface upon which the semi-finished product is posed during the product posing cycle.

10. The tire production system of claim 9, wherein the conveyance assembly comprises:
at least one continuous conveyor belt having an entry extent for receipt of the semi-finished product from an upstream tire production installation and an exit extent that facilitates departure of the semi-finished product from the at least one continuous conveyor belt; and
a delivery roller disposed adjacent the exit extent of the at least one continuous conveyor belt that receives a leading edge of the semi-finished product.

11. The tire production system of claim 10, further comprising a storage spool that furnishes the semi-finished product at the upstream tire production installation.

12. A method for transferring and posing a semi-finished product upon a rotating forming drum having a circumferential forming surface during a product posing cycle, the method comprising the following steps:
providing a tire production system according to claim 9;
transporting the semi-finished product from an upstream tire production installation toward the posing assembly;
transferring a leading edge of the semi-finished product to the posing assembly when the posing assembly is in the ready position;
posing the leading edge of the semi-finished product along at least a portion of the forming surface when the posing assembly is in the posing position; and
actuating the posing assembly between the ready position and the posing position.

13. The method of claim 12, further comprising the steps of:
actuating the lune relative to the carrier surface so as to draw the leading edge of the semi-finished product toward the apex of the outer lune surface;
continuously urging the semi-finished product into alternating engagement with the outer lune surface and the carrier surface as the lune traverses the circumferential extent of the carrier surface; and
calculating a quantity of the semi-finished product that is needed to complete the product posing cycle.

14. The method of claim 13, further comprising the following steps:
determining a quantity of the semi-finished product that has been posed along at least a portion of the forming surface during the product posing cycle; and
cutting the semi-finished product when the quantity of the semi-finished product that has been posed equals a quantity of the semi-finished product that is needed to complete the product posing cycle.

15. The method of claim 14, further comprising, after the step of cutting the semi-finished product, a step of continuously urging the semi-finished product into alternative engagement with the outer lune surface and the carrier surface.

16. The method of claim 15, further comprising a step of forming a joint between the leading edge and a trailing edge of the semi-finished product formed during the step of cutting the semi-finished product.

17. The method of claim 14, further comprising a step of identifying a tangential cutting point at which a blade carrier contacts the outer lune surface and cuts the semi-finished product during the step of cutting the semi-finished product.

\* \* \* \* \*